Dec. 12, 1933.   A. F. MOYER   1,938,855
REVERSING MECHANISM
Filed Aug. 29, 1931   2 Sheets-Sheet 1

INVENTOR
AMOS F. MOYER
By Paul, Paul & Moore
ATTORNEYS

Dec. 12, 1933.   A. F. MOYER   1,938,855
REVERSING MECHANISM
Filed Aug. 29, 1931   2 Sheets-Sheet 2

INVENTOR
AMOS F. MOYER
By Paul, Paul & Moore
ATTORNEYS

Patented Dec. 12, 1933

1,938,855

UNITED STATES PATENT OFFICE 1,938,855

REVERSING MECHANISM

Amos F. Moyer, Minneapolis, Minn., assignor to Toro Manufacturing Company, Minneapolis, Minn., a corporation of Delaware Application August 29, 1931. Serial No. 560,133

8 Claims. (Cl. 180—70)

This invention relates to reversing mechanism for vehicles and concerns itself more particularly with reversing mechanisms which are adapted for use on rollers or other self propelled ground care units having chain drives.

It is a general object of the invention to provide a simplified reversing mechanism which is durable and sturdy, may readily be assembled and also be made accessible for repairs and overhauling, and which operates positively at all times.

It is a more particular object to provide a simplified reversible type of gasoline engine driven roller which is adapted for the rolling of tennis courts and upon which the operator rides, so that the performance of this operation is accomplished with great saving in labor.

In accordance with the invention I employ a pair of sprockets or gears which are both in engagement with the drive of the unit being propelled at all times. Means are further provided for selectively driving one of these gears or sprockets from the engine in one direction, or for driving the other from the engine in reverse direction, one gear idling while the other is being driven. So also, means are provided for disconnecting both gears or sprockets from the engine when desired.

The various objects of the invention will become more readily apparent upon a detailed study of the appended claims, and accompanying drawings and specification which illustrate only one embodiment of the invention, it being understood that its principles may be applied in other ways without departing from its scope.

In the drawings, Fig. 1 is a plan view of a self propelled ground roller having a reversing mechanism in accordance with this invention;

Figure 1:
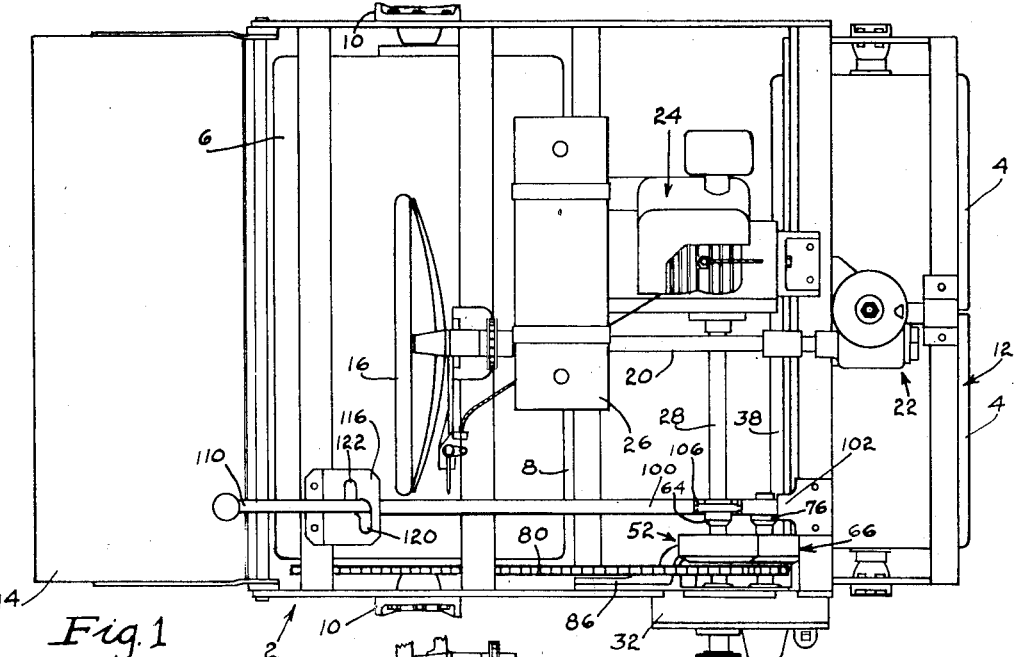

Referring to the drawings, numeral 2 represents a self-propelled ground roller having front and rear rollers 4 and 6, and a frame 8 supported on the rollers by means of rear supports 10 and a front truck 12 which is pivotally connected to frame 8 in the usual manner. A rear platform 14 is provided for the operator who steers the unit by means of a steering wheel 16 operating a chain drive 18 for the shaft 20 which is connected to front truck 12 by means of gearing 22 to turn the same. An internal combustion engine 24 and a fuel supply tank 26 are mounted on the frame 8.

The engine shaft 28 extends transversely of the frame 8 and is journalled adjacent its outer end in a ball bearing 30 provided in the housing 32 which is bolted to a side of the frame 8 by means of bolts 34. The enlarged portion 36 of shaft 28 forms a shoulder bearing against the motor side of the inner race of ball bearing 30 to further steady the shaft. A short shaft 38, which is positioned below the engine shaft 28 and parallel thereto, is journalled for rotation in ball bearings 40 and 42 also provided in housing 32. The shoulder formed by the enlarged portion 44 of shaft 38 and which engages the outer side of the inner race of ball bearing 40, co-operates with the nut 46 which is fastened on a reduced portion of shaft 38 and engages the outer side of the inner row of ball bearing 42, to hold shaft 38 against endwise movement. Pinions 48 and 50, which are within housing 32 and fixed to shafts 28 and 38 respectively, are in constant mesh so that shaft 38 will always rotate in a direction opposite to that of shaft 28 whenever the motor is in operation.

A clutch generally designated at 52 comprises an outer drum 54 and the usual expansible inner shoe 56 which is normally contracted but will expand when its operating arm 58 is pushed radially outwardly. The shoe 56 is fixed on the shaft 28 and the drum 54 is rotatable on a bushing 60. It is held against lateral movement with respect to shaft 28 by the shoe 56 and the enlarged portion 36. A sprocket 62 is formed integrally with the drum 54. A generally cone shaped element 64 is rotatably and slidably mounted on shaft 28 and when moved in the direction of clutch 52 is adapted to engage the operating arm 58 to push it radially outwardly thereby to cause shoe 56 to expand in well known manner. Shaft 38 carries a similar clutch 66 opposite the clutch 52. Its inner shoe 68 is fixed on the shaft 38 and its outer drum 70 has integrally formed therewith a sprocket 72 and is rotatable on a bushing 74 between the shoe 68 and the enlarged portion 44. A slidable cone element 76 is adapted to engage the operating arm 78 of its shoe 68 for expanding the same.

Figure 3:
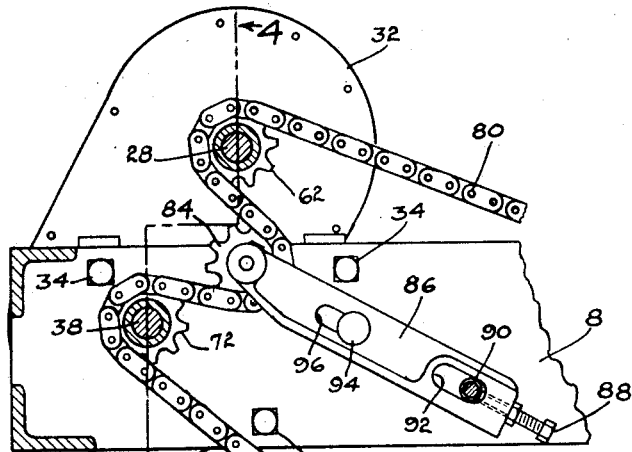
Fig. 3 is a longitudinal vertical cross-section along line 3—3 of Fig. 4, illustrating portions of the reversing mechanism in detail.

A drive chain 80 passes around the large sprocket 82 fixed on the rear roller 6, the sprockets 62 and 72, and the idler sprocket 84. This idler sprocket is arranged between sprockets 62 and 72 and is offset in the direction of rear roller 6 from a center line common to both sprockets 62 and 72. It is rotatably mounted in a support 86 which is slidably attached to frame 8 and whose foremost extent of travel is limited by a set screw 88 engaging a bolt and spacer 90 extending through the slot 92 and frame 8. The bolt 94 which also extends through frame 8 and slot 96 serves to guide support 86, and to lock it in position. Since chain 80 is looped over the front of sprockets 62 and 72, and over the back of idler sprocket 84, it will be apparent that the tension of the chain may readily be adjusted by adjustment of set screw 88. The idler sprocket 84 also causes chain 80 to contact sprockets 62 and 72 throughout a greater portion of their circumference than it would contact if the chain continued in a straight line between these sprockets as will be readily apparent from an inspection of Fig. 3.

Figure 2:
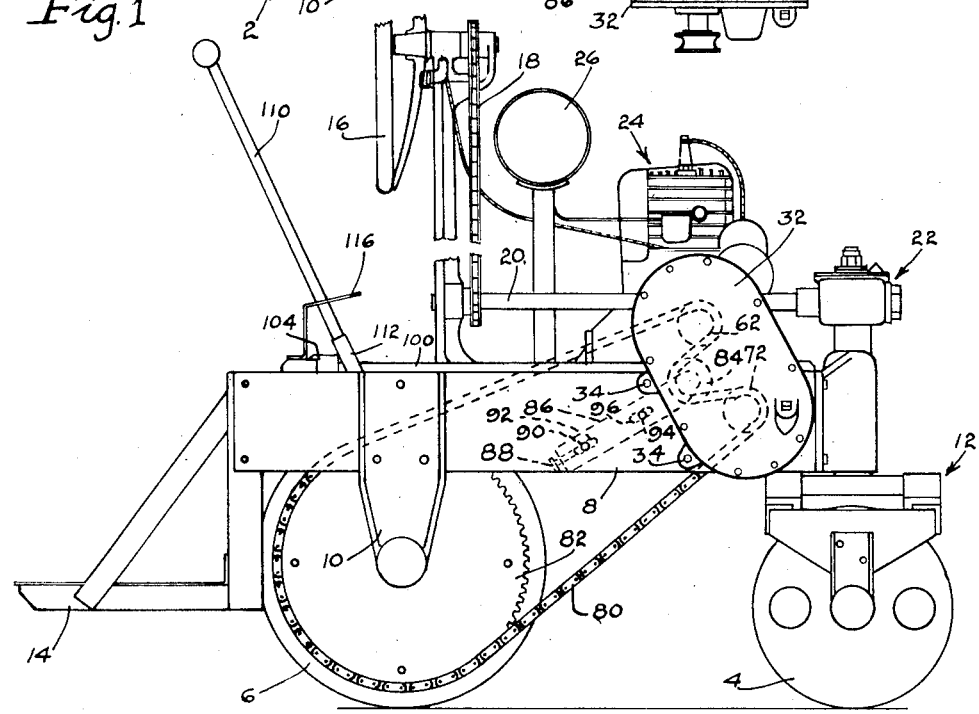
Fig. 2 is a side elevation of the roller shown in Fig. 1.
Figure 5:
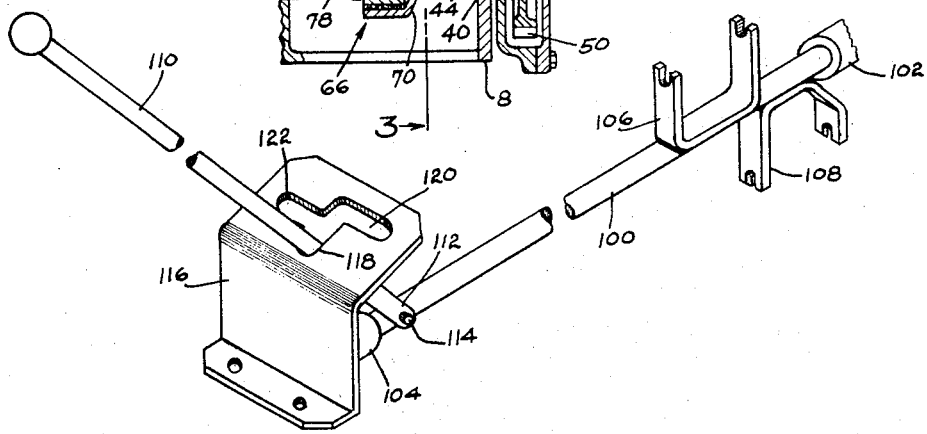
Fig. 5 is a detached view of the clutch operating mechanism.

The shifting shaft 100 extends longitudinally of frame 8 substantially at right angles to shafts 28 and 38 and in a horizontal plane intermediate of the two. It is journalled fore and aft in bearings 102 and 104 for rotation and has fixed thereto, preferably by welding as shown in Fig. 5, a pair of forks 106 and 108 which in this case lie on opposite sides of shaft 100 in a common plane. The forks 106 and 108 engage the trunnion pins (not shown) of trunnion rings 109 and 111 which are attached to the slidable cone shaped elements 64 and 76. A manually operable shifting lever 110 has a forked lower end 112 which is connected to shifting shaft 100 by means of a pivot pin 114. The shifting lever extends upwardly through a slotted opening in the plate 116 which is fixed to the frame 8 and in which slot 118 defines the neutral position of lever 110, slot 120 defines its position to propel the roller forwardly, and slot 122 defines its position to propel the roller rearwardly, the engine shaft being driven in clockwise direction as seen in Fig. 2.

Figure 4:
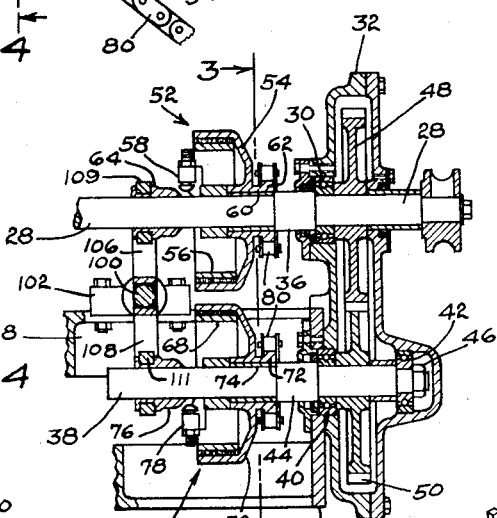
Fig. 4 is a cross-section along line 4—4 of Fig. 3.

In the operation of the unit the operator places the shifting lever in neutral position as shown in Fig. 5 with the result that the forks 106—108 are held in a substantially vertical plane at right angles to the axes of shafts 28 and 38 as shown in Fig. 4. With the forks in this position, both cone shaped elements 64 and 76 are out of engagement with the operating arms 58 and 78 of the inner shoes of their respective clutches 52 and 66 as also shown in Fig. 4. As previously explained, the shoes 56 and 68 are then contracted. The engine is now started and engine shaft 28, clutch shoe 56, and pinion 48 will all be driven in clockwise direction looking from the right of Fig. 4, and pinion 50, shaft 38 and clutch shoe 68 will all be driven in counter-clockwise direction. Since clutch shoes 56 and 68 are both contracted, they will not drive their outer drums 54 and 70 with the result that sprockets 62 and 72 together with the chain 80 will remain stationary and roller 6 will not be propelled in either direction.

When the operator desires to move the unit forwardly, he tilts lever 110 as far forwardly as it will go and then moves it to the right in slot 120, thereby rocking shaft 100 in clockwise direction looking at Fig. 4. This movement of the shaft will move fork 106 in a direction to slide the cone element 64 against the operating arm 58 of clutch 52 to push the same radially outwardly and expand shoe 56. At the same time fork 108 will be moved in a direction to move cone element 76 away from clutch 66. Since shoe 56 is expanded it will be in engagement with its outer drum 54 to drive the same together with its sprocket 62 with the engine shaft 28, that is in clockwise direction looking from the right of Fig. 4. The roller 6 will therefore also be driven in clockwise direction to propel the unit forwardly. During this forward operation the elements of clutch 66 will be disengaged, shoe 68 will be rotated in counter-clockwise direction as previously explained, and sprocket 72 will act as an idler, rotating together with clutch drum 70 in clockwise direction upon the bushing 74.

In order to reverse the unit, lever 110 is moved to the left in slot 122 thereby to rock shaft 100 in counter-clockwise direction and move cone element 64 out of engagement with clutch 52 while moving cone element 76 into engagement with operating arm 78 of clutch 66. When lever 110 is in slot 122 the elements of clutch 52 are thus disengaged and those of clutch 66 are in engagement. Since shaft 38 rotates in counter-clockwise direction, sprocket 72 will be driven in such direction and drive roller 6 to reverse the unit, sprocket 62 meanwhile acting as an idler and rotating in counter-clockwise direction together with the clutch drum 54 on the bushing 60 of shaft 28 which is rotating in clockwise direction together with the shoe 56.

It will also be apparent by comparison with Fig. 2, that when the vehicle is being propelled forwardly, the upper sprocket 62 is the driver, and the upper strand of the drive chain operates in tension while the rest of the chain runs slack. Likewise, when operating in reverse, the lower strand of the drive chain is in tension while the rest of the chain runs slack. Therefore it will be seen that the idler sprocket 84 never has to carry a tight portion of the chain, and in consequence its bearing and the support 86 are greatly relieved of strain.

Having now described my invention, what I claim as new and desire to secure by Letters Patent of the United States is as follows:

1. In a power driven vehicle having a motor and rolling elements, a first shaft driven by the motor, a second shaft operated therefrom by connections producing rotation in an opposite direction, a sprocket supported on each of said shafts, an endless chain engaging both of said sprockets and arranged to drive one of the rolling elements of the vehicle, and means for selectively driving said chain from one or the other of said shafts thereby to propel the vehicle in forward or reverse direction.

2. In a vehicle having a frame, rolling elements for supporting the same, and a motor, a first shaft rotated by said motor, a second shaft, means connecting the first and second shafts for rotating the latter in a direction opposite to that of the former, a first clutch having one of its elements fixed on said first shaft, a second clutch having one of its elements fixed on said second shaft, a sprocket formed on the other element of each of said clutches, means for throwing the elements of each of said clutches into and out of engagement, a sprocket fixed on a rolling element of said vehicle, and a chain connecting said sprocket and the sprockets on said clutches.

3. In a roller unit having front and rear rollers, a frame mounted thereon, and a motor mounted on the frame, a first shaft rotated by the motor, a second shaft, means connecting the first and second shafts for rotating the latter in a direction opposite to that of the former, a first clutch having one of its elements fixed on said first shaft and the other of its elements rotatably mounted thereon, a second clutch having one of its elements fixed on the second shaft and the other of its elements rotatably mounted with respect thereto, a sprocket secured to each of said clutch elements rotatably mounted on one of said shafts, another sprocket fixed on one of the rollers of the unit, an endless chain engaging said sprocket and the sprockets on the clutch elements, and means for selectively throwing the elements of each of said clutches into and out of engagement, whereby said unit may be selectively propelled in a forward or reverse direction.

4. In a vehicle having a frame, rolling elements for supporting the same, and a motor, a first shaft rotated by said motor and transversely disposed with respect to said frame, a second shaft substantially parallel to said first shaft and at a different elevation, means connecting the first and second shafts for rotating the latter in a direction opposite to that of the former, a first clutch having one of its elements fixed on said first shaft, a second clutch having one of its elements fixed on said second shaft, a shifting shaft extending longitudinally in a horizontal plane between said first and second shafts, a shifting lever connected to said shifting shaft, a pair of forks secured to said shifting shaft and arranged to throw the elements of each of said clutches into and out of engagement upon a rocking of the shifting shaft, and means associated with said clutches for driving a rolling element of said vehicle thereby to propel the same.

5. In a roller unit having front and rear rollers, a frame mounted thereon, and a motor mounted on the frame, a first shaft extending transversely of the frame and rotated by the motor, a second shaft parallel to the first shaft and at a different elevation, means connecting the first and second shafts for rotating the latter in a direction opposite to that of the former, a first clutch having one of its elements fixed on said first shaft and the other of its elements rotatably mounted thereon, a second clutch having one of its elements fixed on the second shaft and the other of its elements rotatably mounted thereon, a sprocket formed on each of the said rotatably mounted clutch elements, another sprocket fixed to the rear roller of said unit, an endless chain engaging said sprocket and the sprockets formed on said clutch elements, an idler sprocket arranged between said sprockets on the clutch elements to increase the circumferential contact between said sprockets and said chain, means associated with said idler sprocket for tensioning said chain, a rotatable shifting shaft extending longitudinally of the unit frame in a horizontal plane lying between the said first and second shafts, a shifting lever pivoted to said shifting shaft and arranged to rock the same, and a pair of forks secured to said shifting shaft adapted to throw the elements of said clutches into and out of engagement upon a rocking of the shaft, whereby said unit may be selectively propelled in forward or reverse direction upon manipulation of said shifting lever to rock said shifting shaft.

6. In a vehicle having a frame, rolling elements for supporting the same, and a propelling motor, a pair of substantially parallel shafts rotated in opposite directions by said motor, a driven member having its axis substantially parallel to said shafts, means associated with the driven member for propelling the vehicle, a sprocket mounted on each of said shafts, an endless chain connecting said sprockets and said driven member, means for selectively driving said chain from one or the other of said sprockets, one of said sprockets being adapted to drive the chain when the vehicle is propelled in forward direction and the other of said sprockets being adapted to drive the chain when the vehicle is moving in reverse direction, said driven member being so located with respect to said shafts and the sprockets thereon that when the vehicle is being propelled in forward direction the tight side of the chain extends directly from the driven member to said sprocket adapted to drive the chain during forward movement and when the vehicle is being propelled in reverse direction the tight side of the chain extends directly from the driven member to the other of said sprockets.

7. A device as claimed in claim 6 and also including a chain tightening sprocket engaging said chain between the sprockets on said shafts, whereby the chain tightening sprocket operates on a loose portion of the chain when driving either forward or in reverse.

8. A device as claimed in claim 6 including also a chain tightening sprocket engaging the chain between the sprockets on said shafts and being so located as to increase the contacting arc of the chain upon said sprockets, said chain tightening sprocket operating on a loose portion of the chain when driving either forward or in reverse.

AMOS F. MOYER.